United States Patent [19]

Kallet

[11] 4,305,660
[45] Dec. 15, 1981

[54] RECORDING TRANSMISSION AND EMISSION SPECTRA

[75] Inventor: Eli A. Kallet, New York, N.Y.

[73] Assignee: Farrand Optical Co., Inc., Valhalla, N.Y.

[21] Appl. No.: 163,847

[22] Filed: Jun. 27, 1980

[51] Int. Cl.³ ..................... G01N 21/59; G01N 21/64
[52] U.S. Cl. ........................................ 356/73; 356/318
[58] Field of Search ..................... 356/73, 317, 318; 250/458, 459, 461 R, 461 B

[56] References Cited

U.S. PATENT DOCUMENTS

| | | | |
|---|---|---|---|
| 3,775,620 | 11/1973 | Meier | 356/334 X |
| 3,936,190 | 2/1976 | Ohnishi et al. | 356/318 |
| 4,022,529 | 5/1977 | White | 356/318 |
| 4,031,398 | 6/1977 | Callis | 250/461 R X |

OTHER PUBLICATIONS

Model 204, Manual #990-9685, section 5 B. 1, Apr. 1969.

Primary Examiner—F. L. Evans
Attorney, Agent, or Firm—John L. Downing

[57] ABSTRACT

A first monochromator includes a diffraction grating that is adapted for occlusion by a mirror. When the mirror occludes the grating, a white light input is transmitted through the first monochromator and through a sample under test, thereby causing a transmission of non-absorbed light from the sample. When the grating is unoccluded, monochromatic light is transmitted from the first monochromator so that a selected bandwidth of fluorescence excitation energy is incident on the sample. Fluorescence emission from the sample is diffracted by a second monochromator which provides diffracted light which is recorded by a vidicon.

4 Claims, 2 Drawing Figures

RECORDING TRANSMISSION AND EMISSION SPECTRA

BACKGROUND OF THE INVENTION

1. Field of the Invention

This invention relates to optics and more particularly to recording transmission and fluorescent emission spectra from a sample material.

2. Description of the Prior Art

It is well known that when white light is transmitted to a substance, the substance makes a frequency selective absorption of a portion of the light, the remainder being transmitted through the substance. Additionally, monochromatic light being transmitted to the substance may cause a fluorescent emission therefrom.

The phenomena of either absorption of fluorescence is often combined with a chromatographic separation technique, known as high pressure liquid chromatography, to identify substances in a mixture. Chromotographic separation was introduced by Mikhael Tswett in 1906.

In identifying the source of an oil spill, for example, a decisive factor may be a determination of light transmission characteristics of a sample of the spill. To find the light transmission characteristics, components of the sample are chromatographically separated by forcing the sample, usually under pressure, through an adsorption column. The column may be comprised of silica gel particles or any other suitable substance.

Each component passes through the column at a unique velocity. Therefore, the components pass a known location in the column with a temporal separation therebetween. An exit line from the column typically feeds a cell of a light transmission measuring instrument, such as a filter colorimeter.

Light of a selected wavelength, in the ultra-violet or visible region, is transmitted through the cell. The intensity of the light transmitted through the cell is measured by a detector, which is coupled to a recorder. Since the components have the temporal separation, recorded minima of the light transmitted through the cell is in response to transmission of light through respective ones of the components. In a similar manner, fluorescent emission from the components may be recorded.

It should be understood that the components absorb light differently from each other. Moreover, some of the components may not absorb light at the selected wavelength. Therefore, the use of the filter colorimeter has substantial limitations as an analytic tool. It is desireable to have an instrument that provides a complete spectrum of light transmitted through a component in response to white light being transmitted thereto.

SUMMARY OF THE INVENTION

According to the present invention, a monochromator has an optical path that can alternatively include a diffraction grating or a mirror; when the mirror is positioned in the optical path, a white light input to the monochromator is transmitted to a sample material. The light transmitted through the sample is diffracted by a second monochromator and recorded by a vidicon or other detector. When the grating is positioned in the optical path of the first monochromator monochromatic light is transmitted to the sample to cause a fluorescent emission, and the fluorescent emission from the sample is diffracted by the second monochromator and recorded by a vidicon.

The invention provides simple apparatus, and a method associated therewith, for obtaining transmission and fluorescent emission spectra from a sample.

Other features and advantages of the present invention will become more apparent in the light of the following detailed description of a preferred embodiment thereof as illustrated in the accompanying drawing.

DESCRIPTION OF THE PREFERRED EMBODIMENT

Described hereinafter is an apparatus for alternatively transmitting white light for absorption spectra or monochromatic light for fluorescence excitation. Additionally, the excitation light is transmitted to a component of a sample that passes through a cell connected to an adsorption column. The excitation light causes an emission from the cell that is first diffracted and then recorded.

Figure 1:
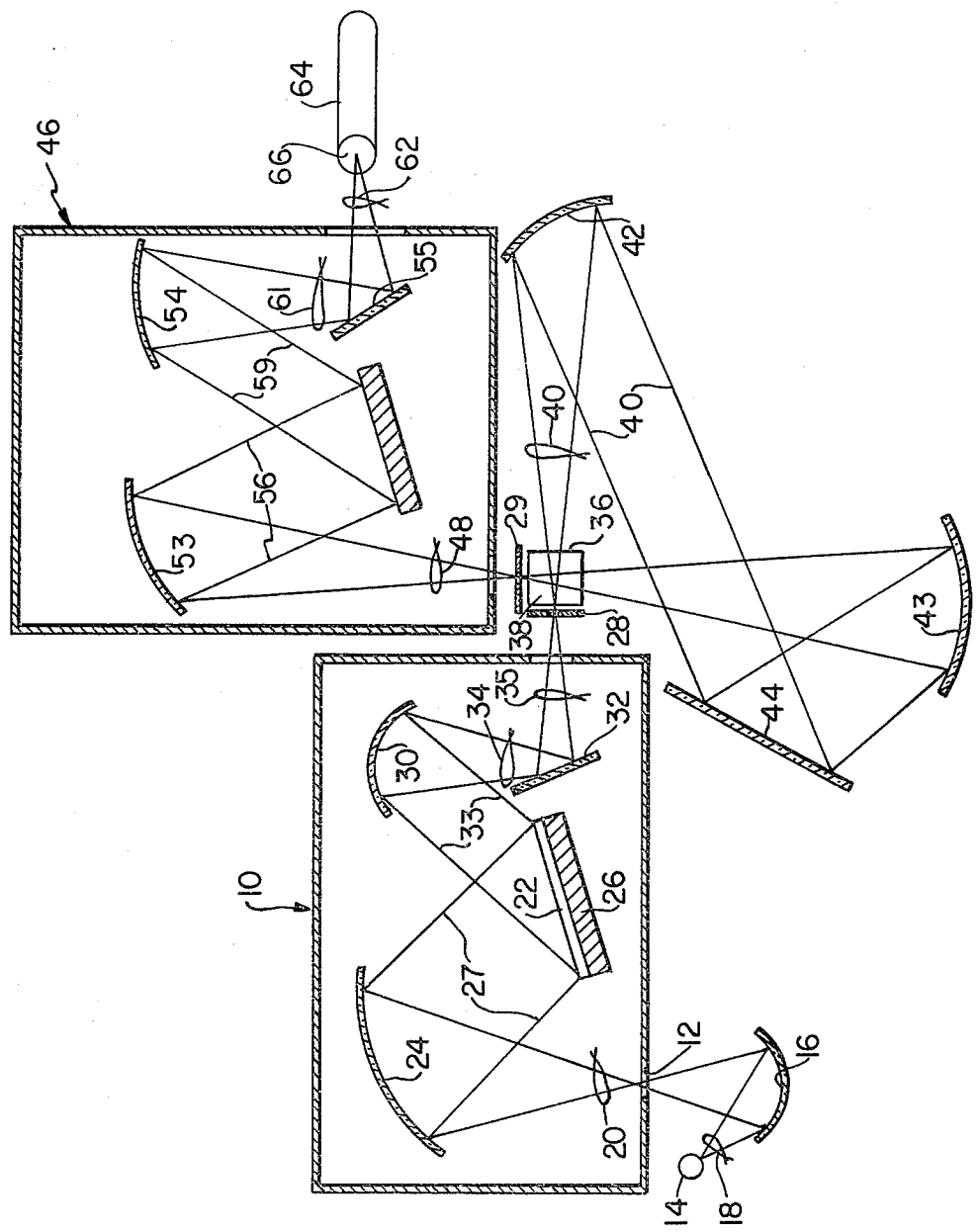
FIG. 1 is a schematic showing of the preferred embodiment of the present invention, in which a mirror occludes a diffraction grating in a first monochromator.

As shown in FIG. 1, a first monochromator 10 has an entrance slit 12 through which an input of white light is received from a source 14 via a reflection from an elliptical mirror 16. Light from the source 14 is exemplified by rays 18. Correspondingly, the input light is exemplified by rays 20.

The monochromator 10 additionally includes a planar mirror 22 disposed in a position to receive the input light via a reflection from a collimating spherical mirror 24. The mirror 22 is superimposed upon and occludes a diffraction grating 26 of the monochromator 10. Light reflected from the mirror 24 is exemplified by rays 27. The monochromator output light is transmitted through an exit slit 28 of the monochromator 10 via successive reflections from a spherical mirror 30 and a planar mirror 32. The light reflected from the mirrors 22, 30, 32 is exemplified by rays 33, 34, 35, respectively. Accordingly, the monochromator output light is transmitted through the monochromator 10 along an optical path, exemplified by the rays 20, 27, 33–35, when the mirror 22 occludes the grating 26.

Because of the occlusion, the light is transmitted undiffracted through the exit slit 28. As explained hereinafter, the light is transmitted through the exit slit 28 to cause a transmission of non-absorbed light from the component referred to hereinbefore. However, when the grating 26 is unoccluded, monochromatic light is transmitted through the exit slit 28 when a fluorescence excitation narrow wavelength bandwidth is to be selected.

The mirror 30 causes the monochromator 10 to have an image plane at the exit slit 28. A sample cell 36 is positioned as shown near the image plane of the monochromator 10.

The cell 36 is connected to an adsorption column (not shown) of the type used in high pressure liquid chromatography. A component 38 of a sample is within the cell 36.

The image input light from the monochromator 10 is incident on the component 38 to cause a first beam of non-absorbed light to be emitted therefrom. The first non-absorbed beam is exemplified by rays 40.

The first non-absorbed beam is transmitted to a spherical mirror 42 for collimation and reflection to a spherical mirror 43 by means of a planar mirror 44. The mirror 43 causes the first non-absorbed beam to be directed to the component 38 and reimaged on an exit slit 29.

Disposition and selection of the mirrors 42–44 for directing and imaging the first non-absorbed beam is in accordance with well known techniques in the optics art.

The directing and imaging of the first non-absorbed beam causes a second beam of non-absorbed light to be transmitted from the component 38 through the slit 29 to a second monochromator 46. The second nonabsorbed beam is exemplified by the rays 48. It should be understood that the mirrors 42–44 cause an increase of the optical path length through the component 38, thereby causing an increased difference between the amount of light initially incident on the component 38 and the amount of light transmitted to the monochromator 46. Hence, the mirrors 42–44 increase the amount of light absorbed by the component 38.

The monochromator 46 has an entrance through which the second non-absorbed beam 48 is received. Additionally, the monochromator 46 includes a diffraction grating 52 and mirrors 53–55 respectively similar to the grating 26 and mirrors 24, 30, 32 referred to hereinbefore. The second non-absorbed beam is collimated and reflected by the mirror 53 to the grating 52. The reflection to the grating 52 is exemplified by rays 56.

An inherent property of a diffraction grating is that it provides diffracted light that makes an angle with the grating that is a function of wavelength. Hence, the grating 52 diffracts the light reflected from the mirror 53, whereby the monochromator 46 provides diffracted output light.

The diffracted output light is transmitted through an opening in the monochromator 46 via reflections from the mirrors 54, 55. The diffracted output light from the mirrors 54, 55 is exemplified by rays 61, 62 respectively.

The mirror 54 causes the monochromator 46 to have an image plane near the face 66 of a vidicon 64. Accordingly, the diffracted output light is imaged on the vidicon 64. The monochromator causes the different wavelength to be separated along the face of the focal plane and thus on the face 66 of the vidicon 64. A vidicon, such as the vidicon 64, is a well known device for recording light. Hence, the diffracted output light is recorded by the vidicon 64.

Figure 2:
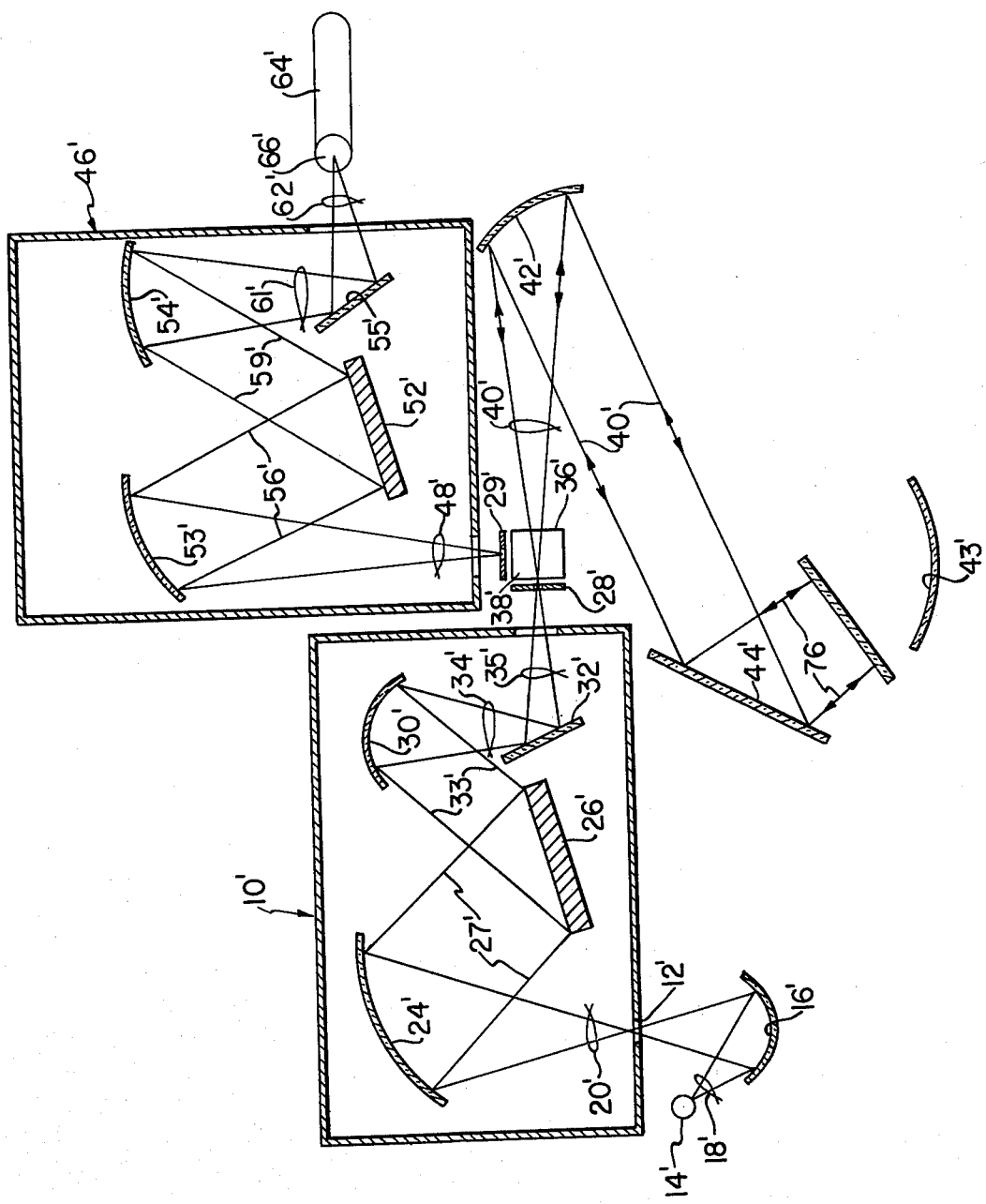
FIG. 2 is a schematic showing of the embodiment of FIG. 1 in which the diffraction grating of the first monochromator is unoccluded.

As shown in FIG. 2, an identical or similar monochromator 10' (elements identified with a prime are substantially similar to their counterparts described in connection with FIG. 1) has a grating 26' unoccluded, whereby the input light from a source 14' through mirrors 18' and 24' is diffracted by the grating 26'. Accordingly, the grating 26' provides diffracted light exemplified by the rays 33'.

The diffracted light is reflected by the mirrors 30', 32' towards the exit slit 28'. It should be understood that the spectral components of the light are spatially separated along the exit slit plane. The exit slit 28' narrowly restricts the path through of this spectrum. Therefore, a substantially monochromatic spectral component of the light passes through the exit slit 28'. The diffracted light reflected from the mirror 30 is exemplified by rays 34'.

The first monochromatic beam is exemplified by exit rays 35'.

The imaging of the first monochromatic beam excites a component 38' in a cell 36' to cause a fluorescent emission of light therefrom, a portion of which is transmitted through the sample cell 36'. The portion of the fluorescent light that is transmitted through the sample cell 36' is exemplified by rays 48'.

The first monochromatic beam passes through the component 38' to form a second monochromatic beam of light that is transmitted therefrom to a spherical mirror 42'. The mirror 42' collimates the first monochromatic beam and reflects it towards a spherical mirror 43' via the plane mirror 44' similar to the manner described in connection with FIG. 1. However the mirror 43' is occluded by a planar mirror 74 that reflects the second monochromatic beam back to the mirror 42' via the mirror 44'.

The mirror 42' causes the second monochromatic beam to be directed to the component 38' and reimaged back to the slit 28'. The second monochromatic beam passes through the component 38 to form a third monochromatic beam of light that is transmitted back to the exit slit 28'. The second and third monochromatic beams are exemplified by rays 40' and the rays 35', respectively.

The directing and imaging of the second monochromatic beam causes an increase of an optical path length through the component similar to the increased path length described in connection with FIG. 1. The increased path length causes an increased fluorescent emission to be transmitted through an entrance slit 29' of a second monochromator 46' and be diffracted by the monochromator 46' to provide the output light as described in connection with FIG. 1. Accordingly, a recording of the fluorescent emission spectrum comprises a recording by a vidicon 64' of the output light provided in response to the increased fluorescent emission being transmitted through the entrance slit 29'.

Preferably, the monochromators 10', 46' and the mirrors 42', 44', 74 are in an arrangement that causes an orthogonal relationship between the path of the fluorescent emission transmitted through the entrance slit 29' and the paths of the monochromatic existing beams, thereby preventing the existing beams from being transmitted through the entrance slit 29'.

It should be understood that the wavelength of the monochromatic light may be selected by rotating the grating 26' thereby selecting the angle of the grating 26' to the collimated white light.

Thus there has been described hereinbefore apparatus and a method associated therewith, for obtaining fluorescent emission spectrum from the sample.

What is claimed is:

1. Apparatus for providing transmission and fluorescent emission data from a sample comprising:
   a light source having a first mode of operation in which monochromatic light is directed toward a first side of said sample, and a second mode of operation in which white light is directed toward the first side of said sample;
   optical means having a first configuration for directing light transmitted from the light source through the sample back toward a second side of the sample, and a second configuration for directing light transmitted from the light source through the sample back to the side of the sample opposite the first side; and detector means for detecting the intensity of light emitted from the side of the sample opposite the second side.

2. Apparatus according to claim 1 wherein said light source comprises a monochromator of a type that includes a diffraction grating for causing monochromatic light to be generated, and means for optionally replacing said grating with a mirror to generate white light.

3. Apparatus according to claim 1 wherein said second side of said sample is positioned at right angles with respect to the first side of the sample.

4. Apparatus according to claim 1 wherein said detector means includes means for recording the spectrum of light emitted from the side of the sample opposite the second side.

* * * * *